United States Patent [19]

Larson et al.

[11] 4,420,668

[45] Dec. 13, 1983

[54] CONSTANT POWER MICROWAVE OVEN

[75] Inventors: Gerald L. Larson, Minnetonka; Robert L. Ellis, Brooklyn Park; Daniel A. Baker, St. Louis Park, all of Minn.

[73] Assignee: Litton Systems, Inc., Beverly Hills, Calif.

[21] Appl. No.: 277,459

[22] Filed: Jun. 25, 1981

[51] Int. Cl.³ .............................................. H05B 6/68
[52] U.S. Cl. ...................... 219/10.55 B; 219/10.55 M
[58] Field of Search ................. 219/10.55 B, 10.55 M; 323/284, 285, 288, 299

[56]  References Cited

U.S. PATENT DOCUMENTS 3,611,017 10/1971 Freeland ...................... 219/10.55 B
3,891,931 6/1975 Nougaret et al. .................... 323/299
4,012,617 5/1977 Burke et al. ................... 219/10.55 B
4,149,057 4/1979 Fritts ............................ 219/10.55 B
4,300,032 11/1981 Niu et al. ...................... 219/10.55 B
4,317,977 3/1982 Buck ............................ 219/10.55 M

FOREIGN PATENT DOCUMENTS 2036378 6/1980 United Kingdom ......... 219/10.55 B

Primary Examiner—B. A. Reynolds
Assistant Examiner—Catherine M. Sigda
Attorney, Agent, or Firm—Robert E. Lowe; John M. Haurykiewicz

[57]  ABSTRACT

An apparatus and method for controlling cooking in a microwave oven whereby the power input to the cooking cavity is held at a predetermined, constant level. Available line power is measured through a winding or tap on the high voltage transformer secondary and the duty cycle of the magnetron power supply is adjusted to maintain a constant average power output.

9 Claims, 6 Drawing Figures

CONSTANT POWER MICROWAVE OVEN

BACKGROUND OF THE INVENTION

This invention relates to the field of microwave cooking and more specifically to an improved method and apparatus for the control of cooking time in a microwave oven.

Cooking by means of microwave energy has become increasingly popular in recent years. One of the major attractions of microwave cooking has been its cooking speed. However, because microwave cooking times are generally shorter than cooking the same food by more conventional means, there is a tendency for some users to misjudge the proper cooking time. In order to alleviate this problem, manufacturers have attempted to develop sophisticated control schemes which will more or less automatically select the appropriate cooking time.

One such method is disclosed in U.S. Ser. No. 73,077 filed Sept. 6, 1979 by Ronald G. Buck and assigned to the assignee of the present application. That application discloses a method wherein the microwave power absorbed by the food over time is determined and compared to a predetermined and stored value of total power required for cooking to doneness. The total cooking time required is then determined. The power is continually monitored and the total cooking time is continually readjusted to compensate for variations in line power (voltage).

The above described method, while satisfactory, requires a large amount of empirically determined food cooking data reflecting various power levels. Relatively large memory storage is required and somewhat complex calculations of food cooking time versus power are required.

Ser. No. 167,304 filed July 10, 1980 by Ronald G. Buck et al discloses an apparatus for measuring the power delivered to the magnetron of a microwave oven and controlling the cooking time in response to delivered power. This technique involves measuring voltage and current on the primary side of the high voltage transformer and multiplying them in a four-quadrant multiplier to obtain a signal proportional to power. Converting the signal to digital form and comparing it with a factory calibration gives the necessary power information for the time control method described in the earlier mentioned Buck application.

SUMMARY OF THE INVENTION

The present invention, while related generally to the relationship of microwave power to cooking time proceeds from an entirely new premise. In the present invention, the power delivered to the microwave cooking cavity is held constant whereby the empirical stored food cooking data is greatly simplified and the necessary calculations, and hence electronic hardware and software, are substantially reduced. Thus the line power to the magnetron is measured and the operation of the magnetron is adjusted with variations in line power to provide constant microwave cooking power to the oven cavity. Since the power in the cavity remains constant, the cooking times for given masses of the same food also remain constant.

For a given magnetron-waveguide-stirrer-cavity system the power delivered to the cavity remains substantially constant provided the power delivered to the magnetron remains constant; that is, magnetron efficiency does not vary in operation, nor does the efficiency of the fixed microwave transmission system. Hence the key datum required is the power to the magnetron. In the present invention the magnetron input power is shown to be proportional to the peak voltage across a transformer secondary sense winding. This discovery allows for substantially simplified electronics over the teachings of the prior art regarding power measurement and calculation in a microwave oven power supply circuit.

BRIEF DESCRIPTION OF THE DRAWINGS

The invention will be described in considerable detail with reference to the enclosed drawings in which:

FIG. 3 is a schematic for peak voltage linear approximation signal generation;

FIGS. 4–6 are electrical schematics showing alternate embodiments of the invention shown in FIG. 2.

DETAILED DESCRIPTION OF PREFERRED EMBODIMENTS

Figure 1:
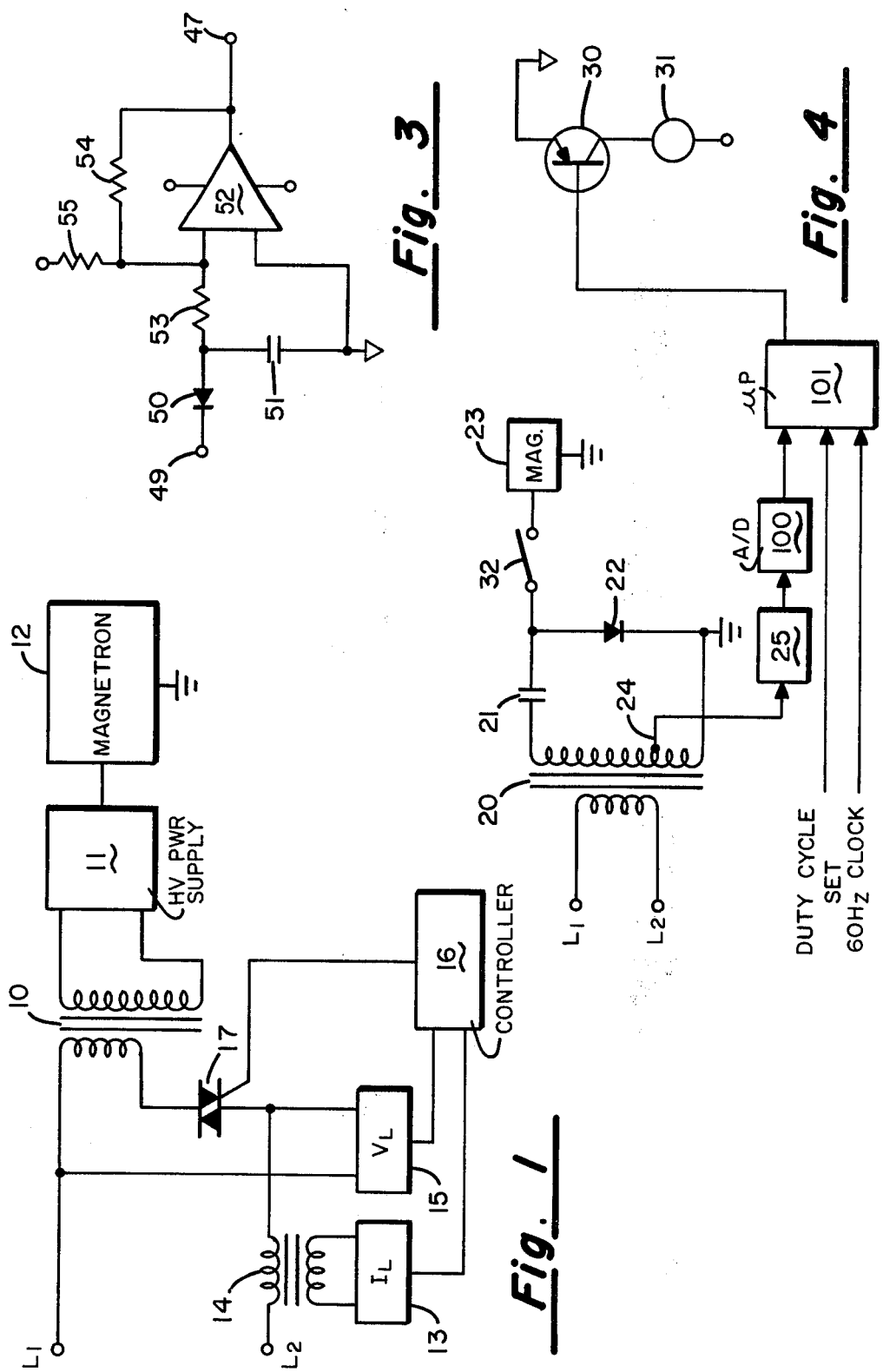
FIG. 1 is an electrical schematic of a circuit for sensing line power and providing constant power to a microwave cavity.

As has been earlier stated, the present invention is premised on the idea of providing constant cooking power to a microwave cooking cavity. Constant cooking power or constant power as used herein refers to average power rather than instantaneous power and may be measured over various time bases, usually less than a minute and more generally in the range of about 1–12 seconds.

Microwave energy is generated by a magnetron tube and introduced into a waveguide through which the energy is delivered to a cooking cavity, often by way of a mixing chamber of some type containing a rotating stirrer or fan. All of these details are well known and standard in the microwave oven industry and hence specific construction details are not shown in the drawings. Suffice it to say that once the energy feed system has been established, including cavity, stirrer, stirrer chamber and waveguide the energy in the cavity is entirely dependent upon the magnetron output and will remain constant so long as the magnetron output remains constant.

In turn, the precise energy output of the magnetron depends upon the power supply driving the tube. One standard design power supply is shown, for example, in FIG. 2 and includes a high voltage transformer 20, a capacitor 21, and diode rectifier 22 poled oppositely to the magnetron 23. This arrangement is a half wave doubler power supply and is widely used in the industry. In such an arrangement, the output power of the magnetron is determined by the output of the transformer 20 and the value of the capacitor 21. Since the capacitor 21 is fixed, the magnetron output is ultimately determined by the output of the transformer secondary which in turn is dependent upon line voltage on the primary.

Line voltage may vary substantially from one part of the country to another but generally falls within the range of about 105 volts RMS to about 125 volts RMS. In a given location line voltage may also vary on a daily basis depending upon total demands on the power delivery network.

The present invention proceeds from the establishment of a minimum low line voltage condition, for example 105 volts. A capacitor, such as 21, is sized so that the magnetron 23 will deliver some preselected value of microwave power to the cooking cavity at the low line voltage. For example, it may be determined that 650 watts of power in the cooking cavity is to be the standard. Hence capacitor 21 is selected so that magnetron 23 will deliver 650 watts when the line voltage is 105 volts.

FIG. 1 depicts one embodiment whereby a cooking control system may be implemented incorporating the above described objective. Power lines $L_1$ and $L_2$ deliver power to the primary of transformer 10. The output of the transformer 10 is delivered to a high voltage power supply 11 which may be of any known type, and the power supply output is delivered to magnetron 12 to drive the magnetron and provide microwave energy to a cooking cavity (not shown).

The line current $I_L$ may be measured by series current sensing transformer 14 connected to a measuring means 13. Line voltage is taken across lines $L_1$ and $L_2$ and measured by measuring device 15. Signals indicative of line voltage and current are fed by measuring devices 13 and 15 to a controller 16, which may include a microprocessor element as well as additional electronic memory storage elements. The controller determines whether the line power is at or above the predetermined minimum for delivering the predetermined "standard" power to the magnetron and hence to the cooking cavity. The controller 16 provides a gating signal to triac 17 to turn the triac on and allow conduction to the transformer 10.

If the measured line power is at the predetermined base minimum, the gating signal to the triac 17 would turn the triac on for a 100% duty cycle. If the line power is above the predetermined base minimum, the controller 16 reduces the duty cycle to less than 100%, the precise duty cycle being selected to insure that the same power is delivered to the magnetron as when line power is at the predetermined base minimum. Thus is the transformer 10 and the high voltage power supply 11 are initially sized so that magnetron 12 will deliver 650 watts of power to the cooking cavity when line voltage is 105 volts, then when measuring device measures a voltage in excess of 105 volts controller 16 will decrease the duty cycle below 100% to compensate for the increased voltage. The reduced duty cycle insures that the cooking cavity will continue to receive average power of 650 watts.

In the event that line voltage drops below the predetermined base minimum, i.e., below 105 volts, several options are available. One option is to simply shut the system down so it will not operate. More preferred is to generate a user signal or "prompt" informing the cook that input line power is too low to operate the automatic cooking system. In such a case, the cook would have the option of operating the oven "manually", that is, by selecting a cooking time and setting the oven timer to that time. It would also be possible to provide a power boost circuit, however because of obvious added cost and complexity this option is not the most preferred.

The circuit shown in FIG. 1 has some drawbacks. Because the power is controlled on the primary side of the transformer, it is necessary to provide a separate filament transformer for the magnetron 12. This is so because in the absence of a separate filament power source the magnetron would be "cold started" at each firing cycle. Because of the delay in bringing a cold started tube up to full conduction and power output, some inaccuracies in average power provided to the cavity will occur. Also a current transformer is required to measure $I_L$ in this configuration.

Figure 2:
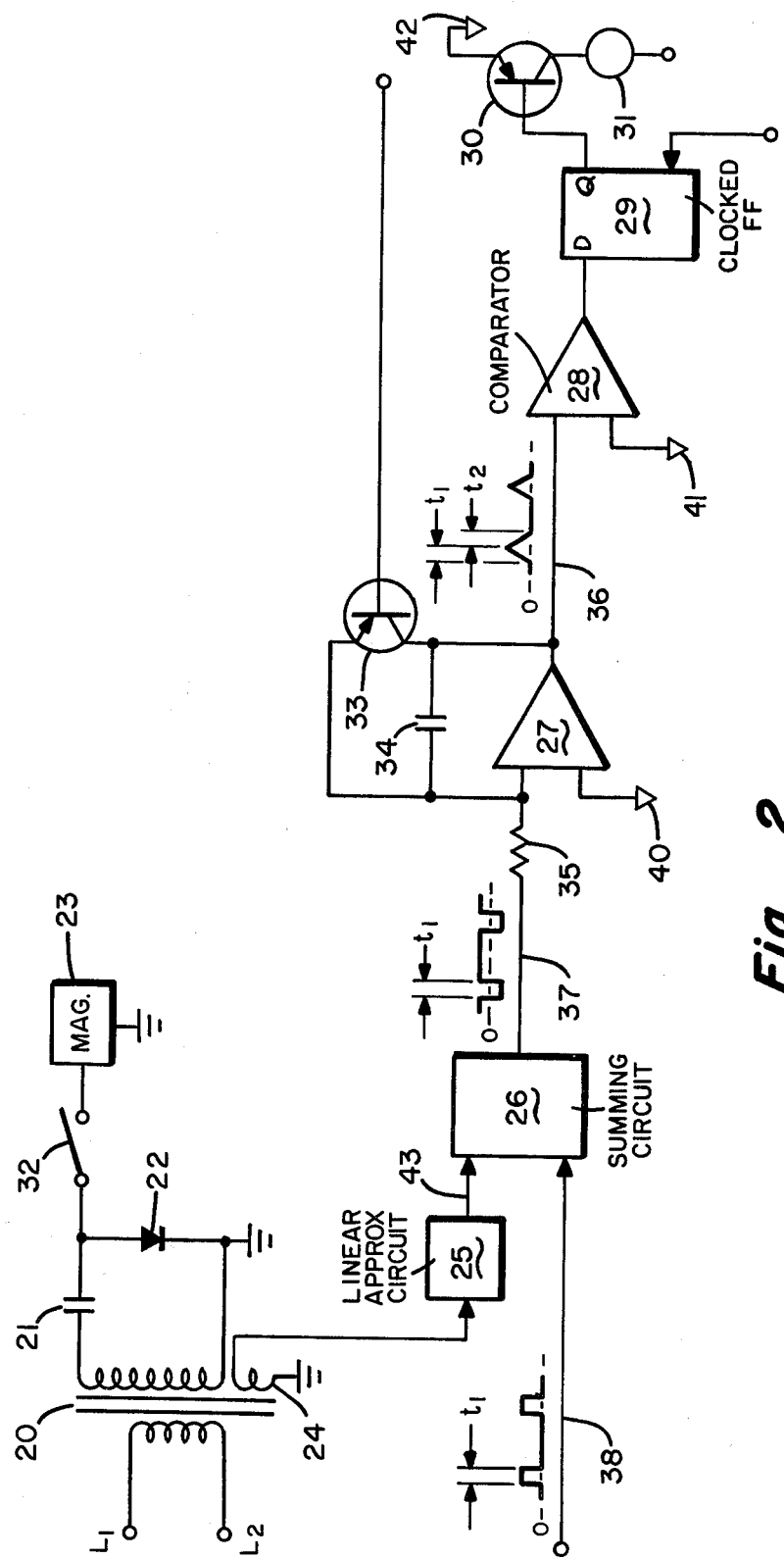
FIG. 2 is an electrical schematic showing a preferred method for determining line power and controlling magnetron output power.
Figure 5:
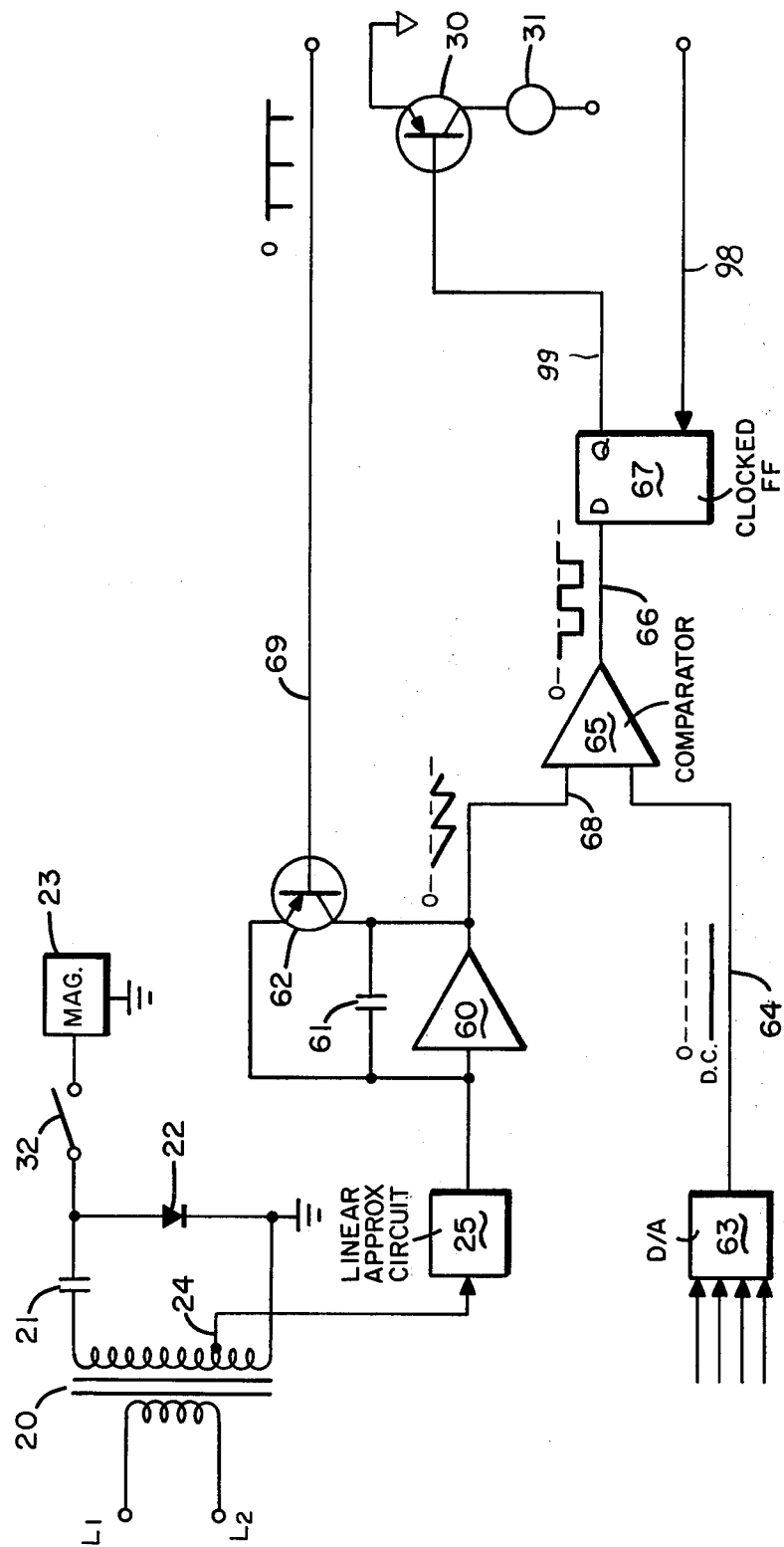
Figure 6:
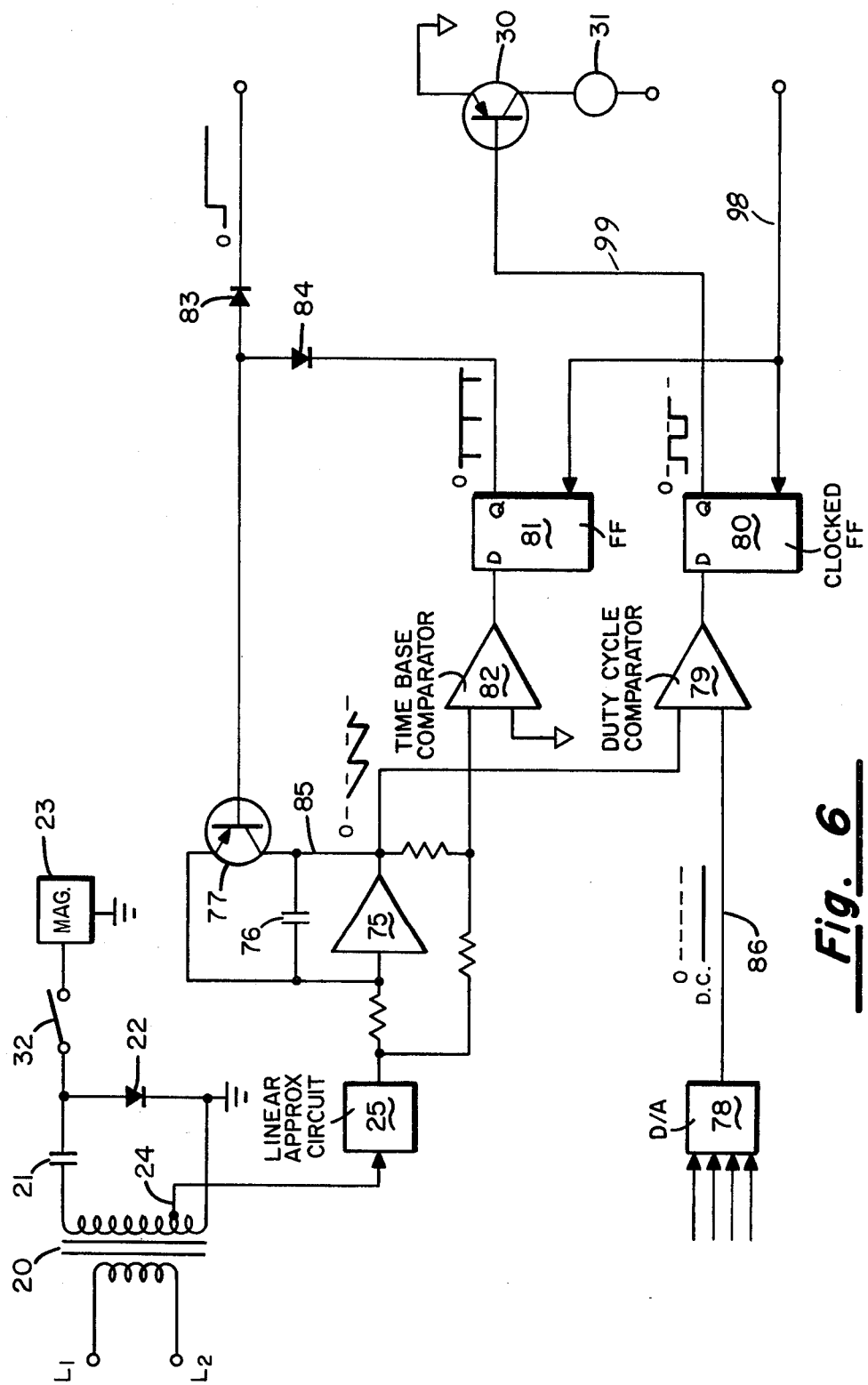

A more preferred circuit for practicing the invention is shown in FIG. 2. As has been previously described, the circuit includes a high voltage transformer 20 fed by power line $L_1$ and $L_2$ at its primary side. The secondary side of transformer 20 is electrically connected to magnetron 23 through capacitor 21. Diode rectifier 22 is connected across the magnetron 23 poled opposite thereto. Also located in series with the magnetron is relay switch 32, the operation of which will be described more fully hereinafter. The peak voltage across the secondary of transformer 20 is picked up by winding 24, shown as a separate, insulated turn on the secondary. This voltage may also be obtained from a tap on the secondary as shown in FIGS. 4–6.

The signal from winding 24 is fed to a linear approximation circuit shown at block 25. This circuit is also shown in FIG. 3. The linear approximation circuit 25 adjusts the bias and gain of the signal from winding 24 to make it compatable with the remainder of the circuit. The output on line 43 is a DC signal directly proportional to measured power delivered to the magnetron 23 as explained in greater detail hereinafter.

The output of the linear approximation circuit 25 is fed to a summing circuit 26. Summing circuit 26 also receives and adds the desired power level signal from a controller/microprocessor (not shown). The desired power level signal is stored in the memory of the controller and is based on food category. For example, some foods benefit from being cooked at less than full power. In such cases the desired power level, in terms of duty cycle, is stored in a ROM to be fetched upon an operator input of that particular food type to be cooked.

The output signal of the summing circuit 26 is shown at line 37 and is a bidirectional signal, which will be of equal pulse magnitude at base reference power. The low state time of the signal will be the same as the desired duty cycle time. This output signal is fed through resistor 35 to a dual slope integrator 27, the other side of which is connected logic "ground" or reference zero as shown at symbol 40, the reference zero being distinct from ground for the power supply portion of the circuit.

The integrator integrates the combined measured power and desired power level signal, the period of integration being directly proportional to the desired power level plus measured power. An internally generated reset signal from transistor 33 clamps the capacitor 34 to zero during the magnetron "off" time.

The output of integrator 27 shown on line 36 is fed to comparator 28, the other side of which is always connected to logic zero shown at symbol 41. The comparator output changes in response to the relative magnitude of the input signals. During the integration time period shown as $t_1$ and $t_2$ waveform on line 36 the comparator 28 output state is high causing the relay 31 to be energized, in turn closing contacts 32 and energizing the magnetron. When the integrator 27 output is at the zero reference line shown in the waveform, the comparator 28 output state is low causing the relay 31 and magnetron 23 to be deenergized.

The output signal from the comparator 28 is supplied to the relay 31 through a clocked flip flop 29 and transistor 30. The flip flop 29 receives the output of comparator 28 as an input at its "D" terminal, and a 60 Hz clock pulse. The flip flop 29 transmits the signal on its D input at the leading edge of the clock input. The leading edge of the clock input is timed to the line voltage cycle to energize or deenergize relay 31 such that the contacts 32 will transfer during zero voltage and current across the contacts.

In operation, a duty cycle is initiated by bringing the desired or set power level "high" for a period of time equal to one half the desired duty cycle time. The magnetron 23 is switched on at this point and the measured input power is determined by the sense winding 24 and the linear approximation circuit 25.

At this point the output of the summing circuit 26 is at maximum negative value and the integrator 27 begins to ramp up at a slope proportional to measured power as shown by $t_1$ in the the waveform at line 36. After the time $t_1$ the set power signal is removed and the output of the summing circuit 26 switches to its maximum positive value proportional to measured power only as input at line 43. The integrator 27 now ramps down at a rate proportional to measured power shown as $t_2$ in the waveform on line 36. The higher the line voltage and hence the measured power the steeper will be the slope $t_2$ and hence the relay "on" time will be less. If the measured power is low the slope at $t_2$ will be flatter and the relay "on" time will be longer. In this manner, the average power to the magnetron is maintained constant over the time base.

It should be clear that operation of the invention requires a determination of the power delivered to the magnetron, and hence the power delivered from the magnetron to the cavity. From the circuit of FIG. 2 it can be seen that all of the power delivered to the magnetron passes through the capacitor 21. Therefore a measurement of power transferred through the capacitor can be used to establish power available in the cooking cavity. Since the energy stored on the capacitor at any given time can be expressed as:

$$E = CV^2/2$$

then the energy transferred through the capacitor can be expressed:

$$E_{max} - E_{min} = (CV^2 max)/2 - (CV^2 min)/2$$

If t equals the capacitor charge time then $$\text{Power} = \frac{C}{2t}(V_{max} - V_{min})^2$$

In the present system it has been found that the capacitor 21 discharges very close to zero. Since Vmax and Vmin are squared the effect of the near zero value of Vmin is even further reduced and power can be effectively expressed as:

$$P = CV^2 max/2t$$

or some constant times the square of Vmax.

A plot of power versus voltage yields a curve which is non-linear in total, however substantial segments of the curve are nearly linear. Since the object of the circuit is to control power around a given point, i.e., 650 watts oven power, only a small portion of the range is used and hence the curve can be assumed to be linear with only small error. Accordingly, power can be directly approximated by measuring the peak voltage across the transformer secondary by means of a voltage tap or discrete winding such as 24.

FIG. 3 shows a more detailed schematic for the linear approximation circuit 25. The transformer peak voltage measured by winding 24 is connected to the circuit at 49 and is charged and held on capacitor 51 by diode 50. Amplifier 52 conditions the signal over the desired control voltage range and provides an output signal at 47 which appears on line 43 in FIG. 2.

Further alternative embodiments of the present invention are illustrated in FIGS. 4 to 6, wherein like reference numerals identify like components from previous figures. In the embodiment shown in FIG. 4 the analog output from linear approximation circuit 25 is converted to a digital value in the analog to digital convertor 100. This binary representation of power is applied to microprocessor 101.

The microprocessor device 101 is custom programmed to input the binary power measurement and the desired power level from the duty cycle set and calculate the required magnetron "on" time to maintain constant average power. The microprocessor 101 controls the high voltage relay 31 and hence its contacts 32 by means of a switching transistor 30. The timing of the relay 31 relative of the 60 Hz line is controlled in the microprocessor 101 by measuring the leading edge of the 60 Hz clock input and performing a delay loop before switching the relay either on or off.

In FIG. 5 the peak voltage across the secondary of transformer 20 is measured at voltage tap 24 and supplied to the linear approximation circuit 25. The linear approximation circuit 25 signal conditions the measured power from the high voltage transformer secondary and adjusts the bias and gain levels to make the signal compatible to the input of integrator 60. The integrator 60 integrates the power signal over the applied duty cycle duration, the slope of the output being directly proportional to measured power. A time base pulse from the controller is transmitted on line 69 to transistor 62 thereby providing a reset signal to the integrator 60 to reset at the end of each time base period. The output of integrator 69 is provided to the comparator 65 via line 68.

A digital to analog convertor 63 accepts a single binary coded digit representative of desired power setting from the microprocessor and converts it to a proportional analog signal. This signal is then connected to the other input of comparator 65 via line 64. The comparator 65 is a bistable device that changes state depending upon the relative magnitude of the two inputs. In this case when the output of the integrator 60 is below the output of the digital to analog convertor 63, the output of the comparator 65 is logic high and indicates a magnetron "on" condition. When the output of the integrator 60 exceeds that of the digital to analog convertor 63, the desired power level has been achieved and the comparator 65 takes a low state and the magnetron is switched off.

The output of the comparator 65 is supplied to the D input of a clocked flip flop device 67. This device transmits the information at it D input to the Q output connected to the collector of transistor 30. A 60 cycle timing pulse is provided on line 98 and the output on line 99 from the flip flop 67 to the transistor 30 occurs at the leading edge of the input clock pulse. The clock leading edge is precisely timed to energize relay 31 such that the contacts 32 will close when the voltage and current across the contacts is zero.

In operation the circuit of FIG. 5 functions as follows. At the end of a time base period, a pulse resets the integrator capacitor 61 to zero. A desired power level is present at the output of the digital to analog convertor 63. At that point the integrator 60 output is less than the set level and the comparator 65 switches the magnetron "on". The integrator 60 senses the power input from the linear approximation circuit 25 and begins to ramp at a rate proportional to the actual measured power. If the measured power is low the slope of the ramp is lower than normal. This increases the time required for the ramp to reach the set power level and hence leaves the magnetron "on" for a longer period of time. Since the time base is fixed the result is increased average power delivered to the cooking cavity.

Yet another embodiment of the present invention is illustrated in the circuit of FIG. 6. In this arrangement an integrator 75 is clamped at zero by a start command input through diode 83 to transistor 77. When the start command goes to the high state the integrator 75 clamp is released and the integrator is allowed to function. The integrator 75 integrates the power signal output from linear approximation circuit 25 over the applied duty cycle duration. The output is a ramp whose slope is proportional to measured power. The integrator 75 reset is accomplished by comparing the ramp output to a multiplier of the integrator input. This allows an internally generated fixed time base by means of time base comparator 82 and flip flop 81.

A digital to analog convertor 78 accepts a single binary coded digit from the microprocessor representative of desired power level and converts it to a proportional analog signal. That signal is then connected to a duty cycle comparator 79. This comparator 79 is a bistable device whose output changes state depending upon the relative magnitude of the input signals. When the output of the integrator 75 is below the set power level as indicated by the signal on line 86 the output of comparator 79 will be high. This signal is interpreted by the following stage as a demand for power and keys the magnetron "on". When the output of the integrator 75 equals or exceeds the set power level, the comparator 79 output changes state to a low level and the magnetron is switched "off".

The clocked flip flop device 80 transmits the information present at its D input to the output Q at the leading edge of a clock input pulse provided at line 98. The clock input pulse is precisely timed to energize the relay 31 such that the contacts 32 will close or open when the voltage and current across the contacts is zero.

In operation, when the oven start command is brought high, the magnetron 23 is switched on and the clamp 76 on the integrator 75 is released. Power is sensed by the integrator input from linear approximation circuit 25 and the output of integrator 75 begins to ramp. The slope of the ramp is proportional to the magnitude of the power being sensed. If the measured power is higher than normal the ramp slope is greater and the ramp voltage reached set power level earlier in time. This turns the magnetron off earlier than normal and the average power is maintained at the desired level.

Hence it can be seen that although a variety of logic circuits and devices, both analog and digital in nature, have been disclosed to accomplish the stated objects of the invention, each of the techniques functions to insure that the power delivered to the microwave cooking cavity remains at some preselected constant level. Although each of the disclosed techniques can be used to simply provide constant power to the cooking cavity, it is certainly preferred that they be used in conjunction with an automatic cooking control in order to have the greatest utility.

In such an arrangement, a microprocessor including a ROM (not shown) has stored therein constants relating to cooking times for various masses of various preselected foods based upon the predetermined power level in the cooking cavity. Hence when an operator inputs a food type and mass by means of a digital code into thr microprocessor, the cooking constant is fetched from the ROM and used to set the oven timer to the predetermined cooking time. Since the power to the cooking cavity remains known and constant throughout the cooking constants and calculations necessary in the microprocessor are greatly simplified.

What is claimed is:

1. In a microwave oven including a magnetron for transmitting microwave energy to a cooking cavity, a power supply for driving the magnetron, and a controller having stored food cooking data corresponding to a plurality of food types and masses, the improvement comprising: means for measuring the power supplied to said magnetron; means for comparing said measured power to a predetermined desired average power corresponding to one of said plurality of food types and masses, and means to vary the duty cycle of said magnetron to cause the average power supplied to said magnetron to equal said predetermined desired average power such that the actual cooking time is equal to the predetermined cooking time for said one of said plurality of food types and masses.

2. The apparatus of claim 1 wherein said power supply includes a high voltage transformer having a capacitor in series with the transformer secondary and said magnetron, and a rectifier connected across said magnetron and poled opposite thereto, and wherein said means for measuring the power supplied to said magnetron comprises means for detecting the peak voltage across the secondary of said transformer and means for signal conditioning said peak voltage to yield a signal proportional to measured power.

3. The apparatus of claim 2 wherein said means to vary the duty cycle comprises a high voltage relay having its contacts in series with said transformer secondary, said capacitor and said magnetron; said relay being energized by logic circuit means, said logic circuit means energizing said relay for a time sufficient to provide predetermined average power to said magnetron.

4. The apparatus of claim 3 wherein said logic circuit means includes means for summing said signal proportional to measured power and a signal proportional to a preset power level; means for integrating the output of said summing means; and comparator means responsive to the output of said integrating means, whereby said relay is energized by an output signal from said comparator means.

5. The apparatus of claim 4 wherein the integration time of said integrating means is directly proportional to the sum of said preset power level and the measured power output of said transformer secondary.

6. The apparatus of claim 2 wherein said means for detecting peak voltage across the transformer secondary comprises a single isolated turn on the transformer secondary.

7. A method of cooking in a microwave oven by providing constant average power to a magnetron from a high voltage power supply in combination with providing a set of stored constants relating to cooking times for preselected foods, where said power supply includes a transformer, a capacitor in series with the transformer secondary and the magnetron, said method comprising the steps of:
  (a) fetching a cooking constant from said set of stored constants;
  (b) setting a predetermined cooking time according to said cooking constant;
  (c) measuring the peak voltage across said transformer secondary and generating a signal proportional thereto;
  (d) summing the signal obtained in step (c) and a signal proportional to a predetermined desired average power;
  (e) integrating the summation obtained in step (d);
  (f) energizing said magnetron only during the integration time; and
  (g) terminating said cooking upon completion of said predetermined cooking time.

8. A method of cooking in a microwave oven by providing constant power in said microwave oven in combination with providing an automatic cooking control where the microwave oven is of the type having a magnetron which supplies microwave power to a cooking cavity and a power supply for said magnetron, and where said automatic cooking control operates according to a set of stored constants selected from among stored food cooking data in response to an operator inputted food type and mass, said method comprising:
  (a) inputting a food type and mass;
  (b) setting a predetermined cooking time in response to said food type and mass according to said stored food cooking data;
  (c) energizing said magnetron;
  (d) measuring the power supplied to said magnetron;
  (e) comparing said measured power to a predetermined desired average power;
  (f) varying the duty cycle of said magnetron power supply to cause the average power supplied to said magnetron to be equal to said predetermined desired average power;
  (g) terminating energizing said magnetron upon a lapse of time equal to said predetermined cooking time.

9. The method of claim 8 wherein said power supply for said magnetron includes a high voltage transformer having a capacitor in series with the secondary of the transformer and said magnetron, and wherein the power supplied to said magnetron is measured by measuring the peak voltage across the secondary of said transformer.

* * * * *